Figure 1:
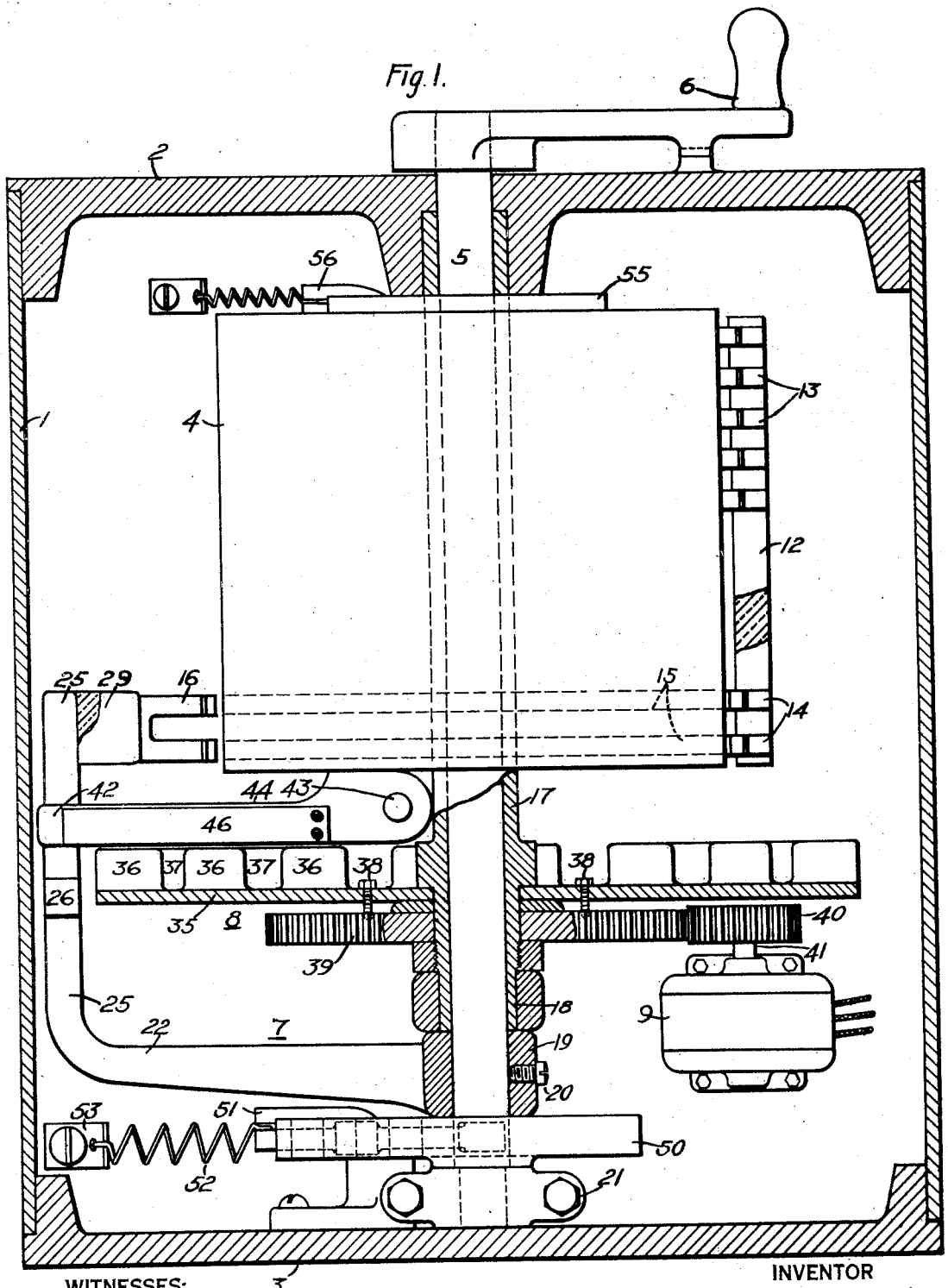

R. E. HELLMUND.
SYSTEM OF CONTROL.
APPLICATION FILED JUNE 18, 1919.

1,416,024.

Patented May 16, 1922.
2 SHEETS—SHEET 1.

WITNESSES:
J. B. Merrill
W. R. Coley

INVENTOR
Rudolf E. Hellmund
BY
Wesley G. Carr
ATTORNEY

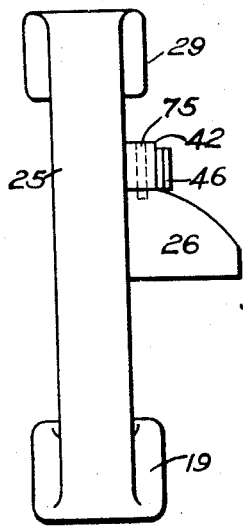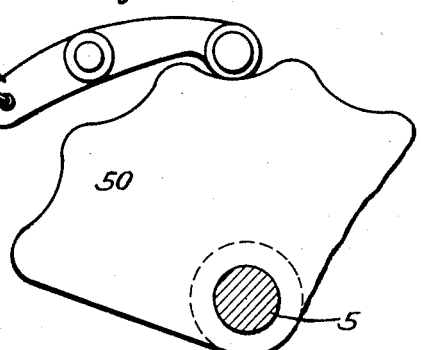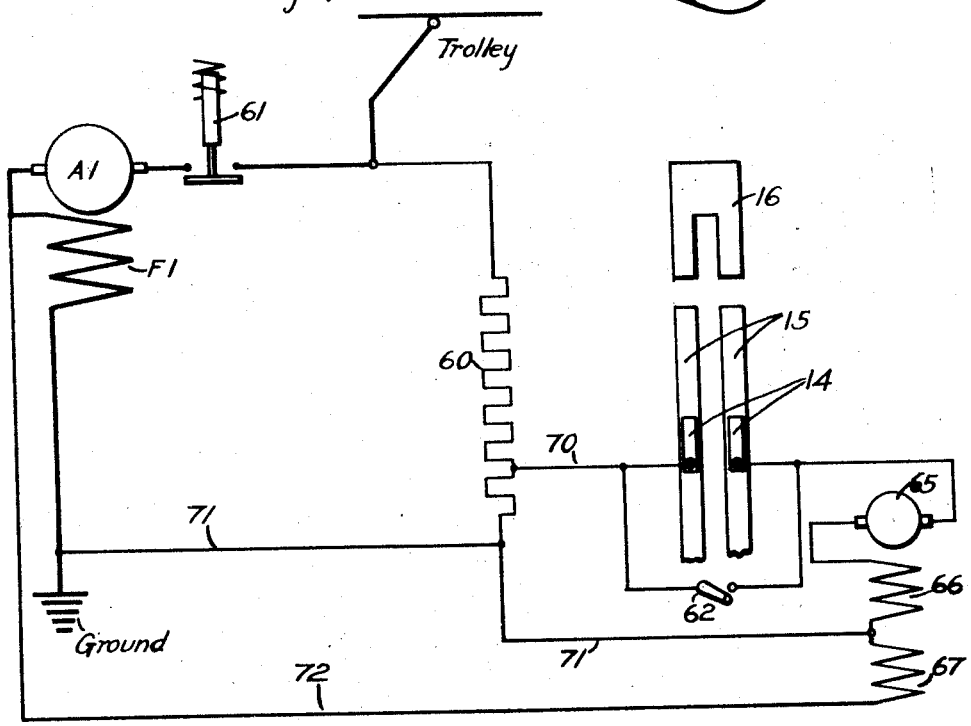

UNITED STATES PATENT OFFICE.

RUDOLF E. HELLMUND, OF SWISSVALE, PENNSYLVANIA, ASSIGNOR TO WESTING-
HOUSE ELECTRIC & MANUFACTURING COMPANY, A COR............
VANIA.

SYSTEM OF CONTROL.

1,416,024.     Specification of Letters Patent.     Patented May 16, 1922.

Application filed June 18, 1919. Serial No. 305,108.

*To all whom it may concern:*

Be it known that I, RUDOLF E. HELLMUND, a citizen of the German Empire, and a resident of Swissvale, in the county of Allegheny and State of Pennsylvania, have invented a new and useful Improvement in Systems of Control, of which the following is a specification.

My invention relates to systems of control and control apparatus for use in connection with electric-railway-motor systems of the well-known automatic type, and it has special relation to pilot-motor-operated controllers, and the like.

In automatic control systems, as provided by the prior art, one handicap has resided in the use of a current relay, or the equivalent, having only one or two settings or critical operating values, whereby, at times of light load, too rapid acceleration has been obtained, while at times of heavy load, undesirably slow or totally interruped accelerating operation has resulted.

One object of the present invention is to provide a system of the above-indicated character which shall eliminate the handicap in question by effecting automatic control of the system through a governing device having a time-element that is inherently dependent upon the load of the system. In this way, under light-load conditions, the accelerating operation is expedited to the proper degree, while, under heavy-load conditions, a slower rate of acceleration is inherently provided.

More specifically stated, it is the object of my invention to provide a master controller, or the equivalent, that is operated by means of a pilot motor having a field winding energized in accordance with the load of the main motor to be controlled.

Other objects of the invention, relating to the simplicity and reliability of construction and to the novel mode of operation of my pilot-motor-operated controller, will become evident from the following detailed description, taken in conjunction with the accompanying drawings, wherein Fig. 1 is a view, partially in section and partially in elevation, of a master controller constructed and organized in accordance with the present invention, Fig. 2 and Fig. 3 are detail views of parts of the controller shown in Fig. 1, and Fig. 4 is a simplified diagrammatic view of a control system embodying a pilot motor connected in circuit in accordance with the present invention.

Referring to Fig. 1 to Fig. 3, inclusive, the structure here shown comprises a master controller having a vertical casing 1 and top and bottom plates or cover members 2 and 3, respectively, for housing a controller drum 4; and an operating shaft 5, which is provided with an external handle 6, for actuating a switch member or arm 7 that cooperates with a drum-actuating device 8 that is primarily governed by a pilot motor 9.

The control drum 4 and its attendant apparatus may be of any familiar type, comprising a suitable finger-base 12 upon which are mounted a plurality of control fingers 13 for engaging or bearing upon one or more contact segments, which do not appear on the drawing, for the familiar purpose of governing the automatic-control operation of an electric motor, for example. The finger-base 12 is also provided with a pair of auxiliary control fingers 14 that are adapted to engage a pair of contact segments or rings 15 (shown dotted because located on the remote side of the drum), which, under operating conditions, are also engaged by a bifurcated contact segment 16 that is actuated by the switch arm 7, in a manner to be hereinafter set forth.

The control drum 4 is not directly actuated by the operating shaft 5 but is rigidly mounted upon a longitudinally extending sleeve 17 which loosely encloses the shaft. The lower end 18 of the sleeve rests upon a hub 19 for the switch arm 7, the hub being rigidly attached to the shaft 5, by means of a set-screw 20, for example. The lower end of the operating shaft 5 is suitably journaled within a bearing or bracket member 21, the upper end of the shaft extending through the top cover member 2 for the purpose of attachment to the operating handle 6.

The control arm 7 may be of integral or compound structure, comprising a bar or rod 22 that extends substantially horizontally from the hub 19 and terminates in a vertically extending portion 25. A cam member 26 is integrally or otherwise secured to one side of the bar 25, which is provided near the upper end of an adjacent face with an insulating block 29, for the purpose of carrying the bifurcated contact segment 16, as clearly shown in Fig. 1.

The drum-actuating device 8 comprises a horizontal engaging member or circular plate 35 having a plurality of upstanding teeth or lugs 36 separated by notches or recesses 37. The plate 35 is rigidly secured by means of bolts 38, or otherwise, to a gear-wheel 39 which, like the plate 35, is loosely mounted upon the sleeve 17. The pinion 40, which is rigidly mounted upon the operating shaft 41 of the pilot motor 9, meshes with the gear-wheel 39, whereby the control drum 4 may be rotatively actuated in a manner to be set forth.

The apparatus 8 further comprises a locking bar 42 which is pivotally mounted at 43 upon a depending lug 44 of the control drum. A flat spring 46 may be secured to one side of the locking bar 42 for a purpose to be hereinafter described.

Near the lower end of the operating shaft 5, a familiar position-accentuating device is provided, comprising a star-wheel 50 having notches corresponding to the positions of the control drum (although the star-wheel is movable relative to the drum), and a pawl 51 having an intermediate pivotal mounting for the purpose of engaging the notches of the star-wheel, towards which the pawl is biased through the agency of a coil spring 52, the outer end of which is secured by a screw 53 to any suitable portion of the controller frame.

A similar position-accentuating device is likewise provided upon the upper surface of the control drum 4, comprising a star-wheel 55 that is rigidly secured to the drum 4 and a co-operating spring-biased pawl 56.

The circuit connections of Fig. 4 will now be described in order to render the complete mechanical and electrical operation of the master controller clear. The illustrated system has been simplified to set forth only the essential elements, since automatic control systems, for railway motors, for example, are so familiar in the art that a complete illustration and detailed explanation thereof in connection with the present invention is believed to be unnecessary. In addition to the control fingers 14 and 16 and the contact segments 15, which have been illustrated on an enlarged scale for the sake of clearness the system comprises suitable supply-circuit conductors Trolley and Ground; a main dynamo-electric machine, such as a car-propelling motor, having a commutator-type armature A1 and a series-connected field winding F1; a line switch 61; a control resistor 60; a manually-operated emergency switch 62; and the pilot motor 9, which comprises a commutator-type armature 65 and a plurality of field coils 66 and 67.

When the line switch 61 has been closed, in the usual manner, through the actuation of the control drum 4, a main circuit is established from the Trolley through the line switch, armature A1 and field winding F1 to Ground. An auxiliary circuit serves to connect the control resistor 60 across the supply-circuit conductors, this control resistor being employed for familiar purposes, such as supplying suitably low-voltage energy to the actuating coils of the various controlling switches that are employed in automatic control systems, as will be understood.

One such low-voltage circuit is continued from a suitable point in the control resistor 60 through conductor 70, control fingers 14 and 16, all of which engage contact segments 15 under operating conditions, whence circuit is completed through pilot-motor armature 65, field coil 66 and conductor 71 to Ground. It will be noted that the circuit just traced is completed whenever control finger 16 bridges contact segments 15, irrespective of the open or closed condition of the line switch 61. Although the other field coil 67 is initially connected in a "live" circuit, the energization of the coil is so weak as to be substantially negligible.

Whenever the line switch is closed to effect energization of the main field winding F1, however, the field coil 67 for the pilot motor is also fully excited by reason of the connection thereof through conductors 71 and 72, across the terminals of the main field winding F1. In this way, the excitation of the pilot motor is rendered inherently dependent upon the load of the main motor, since the field winding F1, in so far as the pilot-motor field-coil 67 is concerned, acts as a resistor, the voltage across which varies in accordance with the load of the main motor.

Consequently, the speed of the pilot motor 9, and, therefore, the movement of the control drum 4, by means of the mechanical connection to be described, is inherently dependent upon the main-machine load, being slow or fast under heavy-load and light-load conditions, respectively. This is a very desirable feature, since rapid automatic operation of the controlling switches is desirable under light-load conditions, while slow automatic control is required when the motors are heavily loaded, to prevent over-load conditions therein.

Referring to Fig. 1, the operation of the structure there shown may be set forth as follows: The operating handle 6 may be quickly moved (in a clockwise direction as viewed from above) to any desired position, corresponding to half or full speed, for example, of one or more motors, and the operating shaft 5, together with the switch arm 7, will be held in the selected position by means of the position-accentuating device comprising the star-wheel 50 and the pawl 51. Such movement of the switch arm 7 immediately effects the desired engagement of the control finger 16 and the contact segments 15 and continues such engagement to the point corresponding to the previous movement of the operating handle 6, to complete the circuit of the pilot motor, as traced in connection with Fig. 4.

Furthermore, the concurrent removal of the cam member 26 permits the locking bar 42 to drop into one of the notches 37 of the engaging plate 35. Consequently, the rotative movement of the plate 35, which is effected through the agency of the pinion 40 and gear-wheel 39, as soon as the pilot motor 9 is energized, produces corresponding rotative movement of the control drum 4 as soon as the locking bar 42 is caught by the engaging plate 35. Thus, the speed of operation of the control drum 4 to its various positions is directly governed by the pilot motor 9, the time-element of operation of which is inherently dependent upon the load of the main machine, as previously described, whenever the line switch 61 has been closed in the usual manner by movement of the control drum 4.

The drum 4 is thus rotated from its "off" position, in the same direction as the arm 7 was previously moved, until the position thereof corresponds to the selected position of the intially-moved switch arm 7, whereupon the locking bar 42 rides along the cam member 26 into the disengaged position with respect to the engaging plate 35 that is shown in the figures. The mechanical connection between the pilot motor 9 and the drum 4 is thus interrupted and, at substantially the same time, the control finger 16, having travelled backwardly over the contact segments 15, becomes disengaged therefrom to open the circuit of the pilot motor. The co-operating parts of the device are so proportioned that the occupation of the desired position by the drum 4 and the stoppage of the pilot motor are practically simultaneous.

The control drum 4 will thus automatically follow the initial manual movement of the operating handle 6 to any selected position, the speed of the drum and, therefore, the rate of acceleration of the main motors, being, meanwhile, dependent upon the load thereof.

When it is desired to cut off the power, the handle 6 may be rapidly returned to the "off" position the switch arm 7 maintaining the locking bar 42 in the illustrated upper position, whereby such return movement is effected independently of the operation of the engaging disc 35 and the pilot motor 9, which may remain in the positions they happen to occupy and still be in readiness for the next control operation.

If step-by-step movement of the control drum is desired, the spring 46 upon the locking bar 42 comes into play in the following manner: Upon movement of the operating handle 6 and the switch arm 7 to the first position, the locking bar 42 becomes disengaged from the cam member 26 and drops into one of the notches 37 in the engaging disc 35, which, as before, is driven by the pilot motor 9. At first, the corresponding lug 36 compresses the spring 46 until the resultant pressure is sufficient to overcome the biasing action of the pawl 56 upon the star-wheel 55. As soon as such critical pressure is reached, the drum 4 rapidly moves to the next operating position as the compressed spring 46 returns to its normal position. Thus, the desired step-by-step movement may be effected, the illustrated apparatus providing a rapid actuation corresponding to each controller notch, independently of the rate of movement of the operating handle 6.

If desired, the brief time necessary for starting the pilot motor, upon each successive movement of the control drum 4 in a forward direction, may be saved by permitting the pilot motor to run continuously. In this event, the control fingers 14 and 16 and the contact segments 15 may, of course, be dispensed with, and direct connection of the pilot-motor armature 65 may then be made through the agency of switch 62, for example, to the control resistor 60.

If, for any reason, straight manual operation of the control drum 4 by the operating handle 6 is desired, it is merely necessary to insert a screw or pin in the opening 75 (shown in Fig. 2), whereby the locking bar 42 and the cam member 26 are rigidly connected. Under such conditions, it will be evident that the forward and reverse movement of the control drum is directly dependent upon the movement of the operating handle 6.

It will be seen that I have thus provided a pilot-motor-operated controller or switching device, the speed of movement of acceleration of and, therefore, the rate of acceleration of the motor to be governed, is inherently dependent upon the load of that motor. Furthermore, my complete control may readily be substituted in any of the present automatic control systems for the master controller now employed, by the addition of the illustrated wires 70, 71 and 72 for the pilot motor, the remainder of the system being connected as before. It will be appreciated that any desired degree of dependency of the rate of acceleration upon the main motor load may be provided by suitable adjustment or simple re-organization of the pilot-motor-excitation circuits.

I do not wish to be restricted to the specific structural details, circuit connections or arrangement of parts herein set forth, as various modifications thereof may be effected without departing from the spirit and scope of my invention. I desire, therefore, that only such limitations shall be imposed as are indicated in the appended claims.

I claim as my invention:

1. In control apparatus, the combination with a rotatable multi-position switching device, of a switch member rotatably associated therewith, power-operated means, means for detachably connecting said power-operated means to said switching device, and means for rendering said power-operated means ineffective when the switching device and the switch member occupy predetermined relative positions.

2. In control apparatus, the combination with a rotatable multi-position switching device, of a switch member rotatably associated therewith, dynamo-electric means, means dependent upon said switch member for connecting said dynamo-electric means to said switching device, and means for de-energizing said dynamo-electric means when the switching device and the switch member occupy predetermined relative positions.

3. In control apparatus, the combination with a rotatable contact-carrying drum, of a relatively movable contact-carrying arm bearing upon said drum, a pilot motor governed by said arm for actuating said drum, and means adapted to break the pilot-motor circuit upon engagement of said arm and a portion of said drum.

4. In control apparatus, the combination with a rotatable contact-carrying drum, of a relatively movable contact-carrying arm bearing upon said drum, means for manually operating said arm to selected positions, a movable engaging member, a locking member normally free from said engaging member and movable with said drum, and a pilot motor governed by said arm for actuating said engaging member to engage said locking member under certain conditions, whereby the drum is moved into a position corresponding to the position of said arm.

5. In control apparatus, the combination with a rotatable contact-carrying drum, of a relatively movable contact-carrying arm bearing upon said drum, means for manually operating said arm to selected positions, a notched engaging member, a locking member movable with said drum and initially held free from said engaging member by said arm, a pilot motor electrically governed by said arm for actuating said engaging member to catch said locking member after movement of said arm, whereby the drum is moved into a position corresponding to the position of said arm, and means for interrupting the pilot-motor circuit upon the coincidence of such positions.

6. In control apparatus, the combination with a rotatable contact-carrying drum, of a relatively movable contact-carrying arm bearing upon said drum, means for manually operating said arm in a step-by-step manner, a notched engaging member, a locking member movable with said drum and initially held free from said engaging member by said arm, a spring secured to said locking member, a biased position-accentuating device associated with said drum, and a pilot motor electrically governed by said arm for actuating said engaging member to receive said locking member and spring after each movement of said arm, whereby the biasing action of said position-accentuating device is intermittently overcome to effect relatively rapid movements of said drum to successive positions.

7. In control apparatus, the combination with a rotatable contact-carrying drum, of a relatively movable contact-carrying arm bearing upon said drum, a pilot motor, manual means for actuating said arm and for effecting engagement of said motor and said drum, and means adapted to break the pilot-motor circuit upon engagement of said arm and a portion of said drum.

In testimony whereof, I have hereunto subscribed my name this 6th day of June, 1919.

RUDOLF E. HELLMUND.